Aug. 30, 1966     C. D. JUBB     3,269,229
GRIPPING TOOL OR VISE HAVING SERRATED
FULCRUMING AND LIMITING MEANS
Filed Dec. 9, 1964
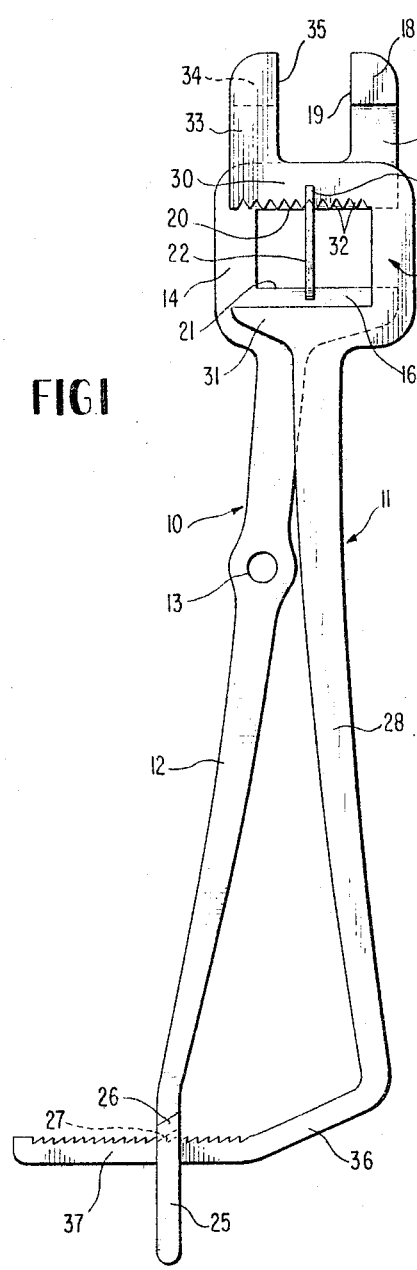
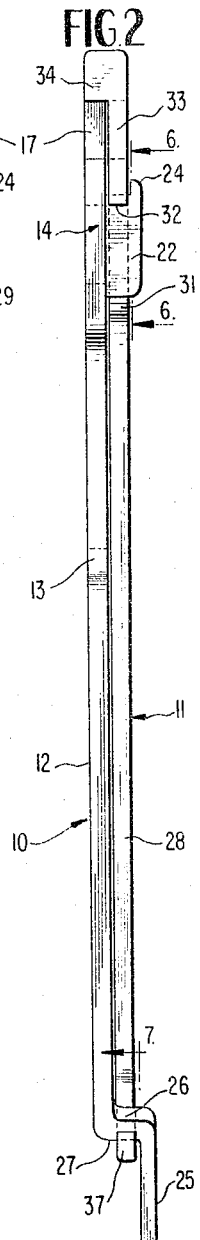
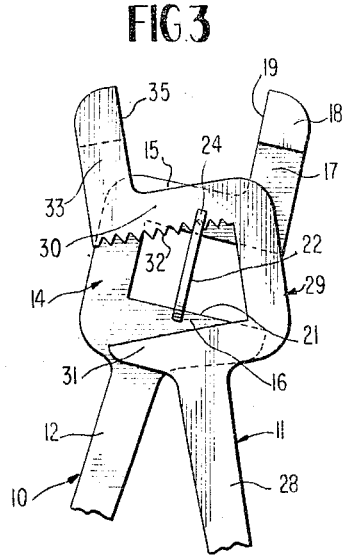
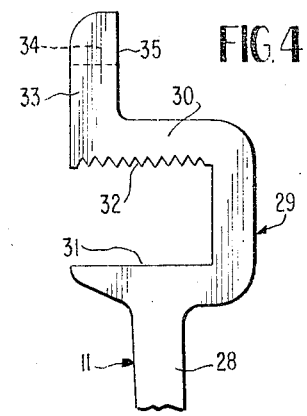
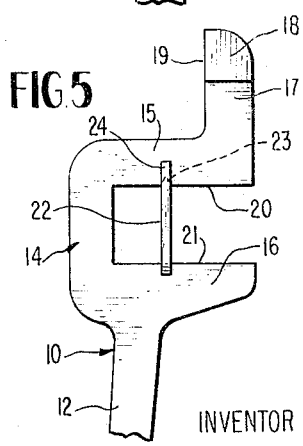
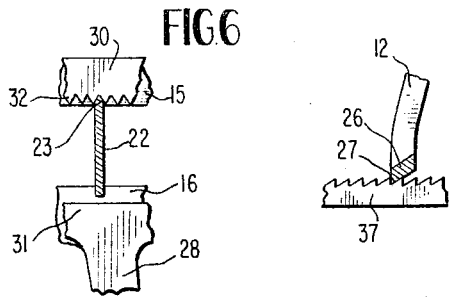
INVENTOR
CHARLES D. JUBB
BY
ATTORNEY

United States Patent Office 3,269,229
Patented August 30, 1966

3,269,229
GRIPPING TOOL OR VISE HAVING SERRATED
FULCRUMING AND LIMITING MEANS
Charles D. Jubb, 908 2nd Ave., Council Bluffs, Iowa
Filed Dec. 9, 1964, Ser. No. 417,055
2 Claims. (Cl. 81—343)

This invention relates to improvements in gripping tools of the vise type.

More particularly, the invention is concerned with a work gripping or clamping tool which is useful for a wide variety of purposes, such as for a jeweler's clamp or vise or for a work holder or assembly tool in many industries employing small parts.

An object of the invention is to provide a tool of the mentioned class which is highly simplified and embodies only two essential parts, thereby rendering the tool highly practical and economical to manufacture.

Another object is to provide a vise-type tool which can be made in various sizes, whereby the tool can be held and manipulated in the hand in smaller sizes or may be bench-mounted in larger sizes.

A further important object of the invention is to provide a work gripping or clamping tool whose gripping jaws are essentially parallel in all gripping positions, the tool having a rather wide range of adjustments so that the jaws may firmly grip very narrow articles or wide articles with equal facility.

Another object is to provide a work holding tool which is easily to adjust and which has a positive locking feature to hold the jaws in parallel gripping relation to work in all adjusted positions of the jaws.

Other objects and advantages of the invention will be apparent during the course of the following detailed description.

In the accompanying drawings forming a part of this application and in which like numerals are employed to designate like parts throughout the same, FIGURE 1 is a side elevation of a gripping tool embodying the invention;

FIGURE 2 is an edge elevation of the tool viewed from the left-hand side of FIGURE 1;

FIGURE 3 is an enlarged fragmentary side elevation illustrating the movement of the two parts of the tool during adjustment;

FIGURE 4 is a fragmentary side elevation of one companion part of the gripping tool including one gripping jaw;

FIGURE 5 is a similar view of the other companion tool part including the other gripping jaw;

FIGURE 6 is an enlarged fragmentary vertical section taken on line 6—6 of FIGURE 2; and FIGURE 7 is a similar section taken on line 7—7 of FIGURE 2.

In the drawings, wherein for the purpose of illustration is shown a preferred embodiment of the invention, the numerals 10 and 11 designate two completely separable and independently formed companion parts or sections which make up the adjustable work gripping tool and constitute the only two elements thereof.

The tool part of section 10 which may be cast or forged comprises an elongated generally straight handle or lever 12 which may have an intermediate opening 13 formed therethrough as an optional feature to facilitate mounting the tool on a workbench or the like as when the tool is made in larger sizes than would be convenient to hold in the hand.

The lever 12 is provided at its forward end, FIGURE 5, with an integral generally C-shaped head 14 including transverse extensions or sides 15 and 16 which are spaced and parallel and perpendicular to the longitudinal portion of the head 14. The open side of the C-shaped head 14 is spaced a considerable distance laterally of the lever 12 as shown clearly in FIGURE 5. The forward side or extension 15 of head 14 carries an integral forwardly projecting work gripping jaw 17, including an enlargement 18 on the terminal end portion thereof so as to form a relatively wide gripping face 19, thicker than the remainder of the jaw 17. The work gripping face 19 is perpendicular to the edges 20 and 21 on the C-shaped adjusting head 14.

At the transverse center of the head 14 and perpendicular to the edges 20 and 21 thereof and spanning the space between such edges is a fulcrum element or plate 22 rigid with the extensions 15 and 16 and preferably formed integral therewith. The fulcrum plate 22 is also parallel to the jaw 17.

As best shown in FIGURE 2, the fulcrum plate 22 projects beyond one side only of the tool part 10 and is perpendicular to the plane of the head 14 and lever 12. The fulcrum plate 22 may be flush with the reverse side of the tool part 10, FIGURE 2. The plate 22 has a rather sharp beveled edge 23 at is forward end, for a purpose to be described and also includes a leading integral retainer lug 24 which aids in maintaining the two companion sections of the tool in assembled relation, as will be further described.

The tool part 10 further comprises a longitudinal locking extension 25 at the rear end of lever 12 including an offset portion 26 having a canted and sharp locking edge or tooth portion whose action will be fully described.

The companion part or section 11 of the tool which may also be cast or forged as a unit comprises a generally straight handle or lever 28 which preferably diverges somewhat from the lever 12 toward the rear ends of the two levers, FIGURE 1. At its forward end, the lever 28 carries a C-shaped head 29 similar to the head 14 although facing in the opposite direction to the head 14 and directly overlying the same in assembly, as shown. The head 29 has forward and rear sides 30 and 31 which are parallel and perpendicular to the longitudinal portion of the head 29. The rear edge of extension or side 30 is serrated as at 32 to provide a plurality of evenly spaced and accurately formed V-shaped adjusting teeth to coact with the beveled edge 23 of fulcrum plate 22. As shown in FIGURE 4, the head 29 carries an integral work gripping jaw 33 on its forward side 30 and adjacent the open side of the head 29. The jaw 33 has an enlargement 34 on its leading end for the same purpose as the enlargement 18. The work gripping face 35 of jaw 33 is perpendicular to the sides 30 and 31 of head 29 and is adapted in assembly to be parallel with the jaw face 19 in all work gripping adjusted positions of the tool.

The lever 28 at its rear end carries an integral transverse adjusting and locking arm 36 including a straight toothed bar portion 37 which is perpendicular to the locking extension 25 and also perpendicular to the jaw face 35 and parallel to the edge 31. The bar portion 37 carries a large number of teeth to enable positive locking of the gripping jaws 17 and 33 in all adjusted positions. The canted tooth portion 27 is adapted to engage and interlock with the teeth on bar portion 37, as shown in FIGURES 1 and 7.

FIGURE 3 illustrates the manner in which the companion tool parts 10 and 11 may be assembled in operating relationship. The heads 29 and 14 are placed in abutting sliding relation and the jaws are arranged at divergent angles. The fulcrum plate 22 is then at a considerable angle to the head part 31 and the two heads 29 and 14 may slide together. The retainer lug 24 engages over the side 30 so as to prevent separation of the two parts of the tool. The beveled edge 23 is now adapted to form a fulcrum or pivot for the head 29 and the two levers 12 and 28 may now be drawn together toward their relative positions in FIGURE 1. When this occurs, the toothed bar portion 37 engages beneath the locking extension 25, as shown in the drawings, and there is preferably, although not necessarily, some frictional engagement between the elements 37 and 25.

The tool is readily adjustable to any jaw spacing by simply returning the parts to the FIGURE 3 position and shifting the fulcrum plate 22 into engagement with various teeth 32. It should now be apparent in light of the above description that the spacing between the jaw faces 19 and 35 can be readily changed or adjusted. When proper spacing is attained for gripping a particular work, the handles or levers 12 and 28 are drawn together firmly and the locking tooth 27 will ride over the preferably slanted teeth of bar portion 37 until firm and positive locking is achieved and, in effect, the levers 12 and 28 cannot be drawn further together due to the presence of the work being held between the jaws. Whenever the tool is thus locked in any adjusted position, the jaw faces 35 and 19 are always essentially parallel as are the longitudinal portions of adjusting heads 14 and 29, and this constitutes an important feature of the invention.

In order to release the work being held and to allow separation of the jaws, the locking extension 25 is lifted relative to the bar portion 37, FIGURE 1, to shift the locking tooth 27 out of engagement with a particular tooth of bar portion 37. In other words, the two lever portions of the tool as viewed in FIGURE 2 are simply sprung apart sufficiently to disengage the single tooth edgewise from the bar portion 37, after which the tool jaws may be readily separated.

When the tool is adjusted and locked, its jaws are capable of exerting a powerful gripping force because of the heavy leverage in the tool. The fulcrum point 23 is close to the relatively short jaws 17 and 33, FIGURE 1, whereas the locking means 27 and 37 is at the remote ends of long levers 12 and 28. Once locked or set, it is impossible for the tool to slip and open until the parts 25 and 37 are separated laterally as described. The tool consists essentially of only two parts rendering it highly simplified, inexpensive to manufacture and easy to use. It is thought that the advantages of the tool and its wide utility will be readily apparent to those skilled in the art, without the necessity for any further description.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A two-part gripping tool comprising in combination a first independently formed tool section including an elongated lever, a substantially C-shaped head carried by one end of the lever including a forwardly projecting jaw near the open side of said head, said head having a forward transverse side whose rear edge is serrated, a toothed transverse bar portion on the rear end of said lever and projecting toward the open side of said head and being substantially perpendicular to said jaw and parallel to said serrated edge, a second independently formed tool section including an elongated lever substantially coextensive with the first-named lever, a substantially C-shaped head carried by one end of the second-named lever and adapted for superposed oppositely facing relation with the first-named head, the head of the second tool section including a forwardly projecting jaw near the open side thereof adapted with the jaw of the first tool section to grip work, a fulcrum plate secured rigidly to the head of the second tool section near the transverse center thereof and having a forward beveled edge extending normal to the head of the second tool section and engageable with said serrated edge, said fulcrum plate having a retainer part overlapping the head of the first tool section to resist separation of the tool sections while permitting free pivoting thereof, and a locking tooth element on the remote end of the lever of the second tool section engageable with the teeth of said toothed transverse bar portion of the first tool section.

2. The invention as defined by claim 1, and wherein said locking tooth element on said remote end of the lever of the second tool section is formed by a relatively short offset portion of said lever extending across said toothed transverse bar portion, said toothed transverse bar portion being somewhat resilient to permit disengagement of the teeth thereof from said locking tooth element.

References Cited by the Examiner

UNITED STATES PATENTS

| | | | |
|---|---|---|---|
| 1,027,693 | 5/1912 | Collister | 81—328 X |
| 1,221,042 | 4/1917 | Frankell | 81—394 X |
| 2,402,215 | 6/1946 | Thomas | 81—394 X |
| 2,962,024 | 11/1960 | Raymond. | |

FOREIGN PATENTS

| | | |
|---|---|---|
| 192,604 | 10/1957 | Austria. |
| 461,976 | 12/1949 | Canada. |

WILLIAM FELDMAN, *Primary Examiner.*

MILTON S. MEHR, *Examiner.*